(12) United States Patent
Wang et al.

(10) Patent No.: US 10,311,811 B2
(45) Date of Patent: Jun. 4, 2019

(54) ARRAY SUBSTRATE, DISPLAY DEVICE AND DRIVING METHOD

(71) Applicants: Boe Technology Group Co., Ltd., Beijing (CN); Chongqing Boe Optoelectronics Technology Co., Ltd., Chongqing (CN)

(72) Inventors: Xiaoyuan Wang, Beijing (CN); Wu Wang, Beijing (CN); Jaikwang Kim, Beijing (CN); Zhuo Xu, Beijing (CN); Yajie Bai, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 232 days.

(21) Appl. No.: 15/311,899

(22) PCT Filed: Jan. 26, 2016

(86) PCT No.: PCT/CN2016/072123
§ 371 (c)(1),
(2) Date: Nov. 17, 2016

(87) PCT Pub. No.: WO2017/036081
PCT Pub. Date: Mar. 9, 2017

(65) Prior Publication Data
US 2018/0190216 A1    Jul. 5, 2018

(30) Foreign Application Priority Data
Aug. 28, 2015  (CN) .............................. 201510538377

(51) Int. Cl.
*G09G 3/36* (2006.01)
*G02F 1/133* (2006.01)
(Continued)

(52) U.S. Cl.
CPC .......... *G09G 3/3611* (2013.01); *G02F 1/133* (2013.01); *G02F 1/1343* (2013.01);
(Continued)

(58) Field of Classification Search
CPC .................. G09G 3/3611; G09G 3/36; G09G 2310/0264; G02F 1/133; G02F 1/13306;
(Continued)

(56) References Cited

U.S. PATENT DOCUMENTS

| 2007/0091044 A1 | 4/2007 | Park et al. |
| 2007/0097072 A1* | 5/2007 | Kim ..................... G09G 3/3614 345/103 |

(Continued)

FOREIGN PATENT DOCUMENTS

| CN | 102087842 | 6/2011 |
| CN | 103529610 A | 1/2014 |

(Continued)

OTHER PUBLICATIONS

International Search Report for PCT/CN2016/072123 dated May 27, 2016.
(Continued)

*Primary Examiner* — Amare Mengistu
*Assistant Examiner* — Gloryvid Figueroa-Gibson
(74) *Attorney, Agent, or Firm* — Calfee, Halter & Griswold LLP (57) ABSTRACT

The array substrate comprises a plurality of gate lines extending in a first direction, a plurality of data lines extending in a second direction crossing the first direction, and a plurality of pixel units arranged as an array. Each of the plurality of data lines is arranged between two columns of pixel units, the two columns of the pixel units extending in the second direction and being adjacent to each other in the first direction, and the data line is connected to pixel
(Continued)

units at one side of said data line or to pixel units at the other side of said data line. Each of the plurality of data lines switches the direction of connection from one side to the other in an alternating manner with each two adjacent rows of pixel units, and the plurality of data lines have the same connection direction in each row of pixel units.

18 Claims, 6 Drawing Sheets

(51) Int. Cl.
  *G02F 1/1362* (2006.01)
  *G02F 1/1368* (2006.01)
  *G02F 1/1343* (2006.01)
(52) U.S. Cl.
  CPC .......... *G02F 1/1362* (2013.01); *G02F 1/1368* (2013.01); *G02F 1/13306* (2013.01); *G02F 1/136286* (2013.01); *G09G 3/3614* (2013.01); *G09G 3/3659* (2013.01); *G09G 2300/0426* (2013.01); *G09G 2310/0264* (2013.01); *G09G 2320/0247* (2013.01)
(58) Field of Classification Search
  CPC ................. G02F 1/1343; G02F 1/1362; G02F 1/136286; G02F 1/1368

USPC ........................................................ 345/690
See application file for complete search history.

(56) References Cited

U.S. PATENT DOCUMENTS

| | | |
|---|---|---|
| 2010/0259512 A1 | 10/2010 | Lin et al. |
| 2010/0265238 A1 | 10/2010 | Lee et al. |
| 2012/0169688 A1* | 7/2012 | Chen ...................... G09G 3/003 345/209 |
| 2014/0009458 A1 | 1/2014 | Nam et al. |

FOREIGN PATENT DOCUMENTS

| | | |
|---|---|---|
| CN | 103558720 | 2/2014 |
| CN | 103676380 | 3/2014 |
| CN | 104155820 | 11/2014 |
| CN | 105182638 | 12/2015 |
| KR | 20080002384 A | 1/2008 |
| TW | 201037440 | 10/2010 |

OTHER PUBLICATIONS

First Office Action for Chinese Patent Application No. 201510538377.7 dated Nov. 23, 2017.
Search Report from European Patent Application No. 16791294.8 dated Dec. 21, 2018.

\* cited by examiner

ARRAY SUBSTRATE, DISPLAY DEVICE AND DRIVING METHOD

The present application is the U.S. national phase entry of PCT/CN2016/072123, with an international filing date of Jan. 26, 2016, which claims the benefit of Chinese Patent Application No. 201510538377.7, filed on Aug. 28, 2015, the entire disclosure of which is incorporated herein by reference.

TECHNICAL FIELD

The present application relates to an array substrate, a display device and a driving method thereof, in particular to an array substrate having a 2-line dot inversion mode, a display device and a driving method thereof.

BACKGROUND

Inverting the polarity of output signals on the data lines can prevent liquid crystal molecules on the liquid crystal display panel from aging and can improve display quality. Common ways of polarity inversion include frame inversion, row inversion, column inversion, dot inversion, etc., wherein dot inversion includes 1-line dot inversion, 2-line dot inversion, and 1+2-line dot inversion.

As far as 1 line dot inversion is concerned, in a picture mode of a 1-line dot flickering mode, all the bright pictures have a positive polarity, which results in that the liquid crystal capacitor cannot have high frequency polarity switching in either the vertical direction or the horizontal direction, thus causing serious picture flickering. 2-line dot inversion can solve the problem of picture flickering appeared in the picture mode of the 1-line dot flickering mode.

In addition, as for an array substrate that has a "dual gate line" structure and is controlled by the 1-line dot inversion mode, the polarities of pixels at the two sides of each of the data lines in the same row are arranged in a positive and negative alternating pattern, so due to the influence from data line delay, pixels at the two sides of each of the data lines in the same row will have different charging effects, thus affecting the image display quality. The 2-line dot inversion mode can effectively alleviate this phenomenon.

However, when applying the 2-line dot inversion to an array substrate having a 1-line dot inversion mode according to the prior art, the power consumption will increase.

SUMMARY

The technical solution of the present application is proposed to solve the above-mentioned problem in the prior art. The array substrate, display device and driving method thereof according to embodiments of the present application can provide a way of inversion, i.e. 2-line dot inversion, to solve the problem of picture flickering occurred under specific display pictures in 1-line dot inversion without increasing the power consumption of the array substrate.

According to an exemplary embodiment of the present application, an array substrate is provided, which comprises a plurality of gate lines extending in a first direction, a plurality of data lines extending in a second direction crossing the first direction, and a plurality of pixel units arranged as an array along the first direction and the second direction. Each of the plurality of data lines is arranged between two columns of the pixel units, the two columns of the pixel units extending in the second direction and being adjacent to each other in the first direction, and the data line is connected to pixel units at one side of said data line or to pixel units at the other side of said data line. Each of the plurality of data lines switches the direction of connection from one side to the other in an alternating manner with each two adjacent rows of pixel units, and the plurality of data lines have the same connection direction in each row of pixel units.

According to an embodiment of the present application, each of the plurality of gate lines can be corresponding to a row of pixel units extending in the first direction.

According to an embodiment of the present application, each pixel unit can include a pixel electrode and a thin film transistor, the pixel electrode being connected to a drain of the thin film transistor, the gate line being connected to a corresponding pixel unit through a gate of the thin film transistor, and the data line being connected to a corresponding pixel unit through a source of the thin film transistor.

According to an embodiment of the present application, every two gate lines can be corresponding to a row of pixel units extending in the first direction, and respectively arranged at two sides of said row of pixel units in the second direction.

According to an embodiment of the present application, each pixel unit can include a first pixel electrode and a second pixel electrode, as well as a first thin film transistor and a second thin film transistor corresponding to the first pixel electrode and the second pixel electrode, respectively, and the first pixel electrode and the second pixel electrode are respectively connected to respective drains of the first thin film transistor and the second thin film transistor. Two gate lines corresponding to one row of pixel units can be respectively connected to respective gates of the first thin film transistor and the second thin film transistor in said row of pixel units, and the data lines can be connected to the corresponding pixel units through respective sources of the first thin film transistor and the second thin film transistor.

According to an embodiment of the present application, the first pixel electrode and the second pixel electrode can be arranged in the pixel units along the first direction.

According to an embodiment of the present application, one of the two gate lines corresponding to a row of pixel units can be connected to a gate of each of the first thin film transistors in said row of pixel units, while the other one of the two gate lines corresponding to the row of pixel units can be connected to a gate of each of the second thin film transistors in said row of pixel units.

According to an embodiment of the present application, the polarities of output signals on each data line may remain unchanged within one frame, and the polarities of output signals on two data lines adjacent in the first direction are opposite.

According to an embodiment of the present application, the polarities of output signals on each data line may be inverted once between two adjacent frames.

According to another exemplary embodiment of the present application, a display device is provided, which comprises an array substrate according to any of the above embodiments.

According to still another exemplary embodiment of the present application, a method of driving the array substrate according to the present application is provided, which comprises: keeping the polarities of output signals on each data line unchanged within one frame, and making the polarities of output signals on two data lines adjacent in the first direction to be opposite, so that a voltage applied to the pixel units has a polarity inversion in the first direction using one pixel unit as a period and in the second direction using two pixel units as a period.

The array substrate, display device and driving method thereof according to the embodiments of the present application can provide the way of inversion of 2-line dot inversion to solve the problem of picture flickering occurred under specific display pictures in 1-line dot inversion without increasing the power consumption of the array substrate.

BRIEF DESCRIPTION OF THE DRAWINGS

By means of the detailed descriptions below with reference to the drawings, the above and other exemplary embodiments, and the characteristics and advantages of the exemplary embodiments will become more clearly appreciated, wherein.

DETAILED DESCRIPTION

The exemplary embodiments of the present application will be now described in further detail with reference to the drawings.

But the present application can be embodied in many different forms, and it shall not be considered as being limited to the specific embodiments illustrated herein. The embodiments are only provided to make the disclosure of the application thorough and complete and to fully convey the scope of the inventive concept to those skilled in the art.

In the drawings, the shapes and sizes of elements can be exaggerated for the sake of clarity. The same reference signs will always be used to indicate the same or similar elements.

For facilitate description, such terms as "under", "above", "left" and "right" describing a relative spatial relationship can be used in this text to describe the relationship between one element or feature and other element(s) or feature(s) shown in the figures. It shall be understood that the relative spatial terms intend to cover other orientations of a device that is in use or in operation than the orientations shown in the figures. For example, if the device shown in the figure is inverted, then the element that has been described as "under other elements or features" will accordingly be orientated as "above other elements or features". Thus the exemplary term "under" covers the two orientations of "above" and "under". A device can also be orientated in other ways (rotating 90 degrees or in other orientations), and the terms describing relative spatial relationship used in this text will be respectively explained.

Unless otherwise defined, all terms (including technical and scientific terms) used in this text have the meaning commonly understood by those ordinarily skilled in the field to which the present application pertains. It shall also be appreciated that unless otherwise defined explicitly in this text, those terms as defined in universal dictionaries shall be construed to have the meaning that they usually have in the relevant technology and/or in the context of the present specification, but they should not be construed as having an ideal or an unduly formal meaning.

Figure 1:
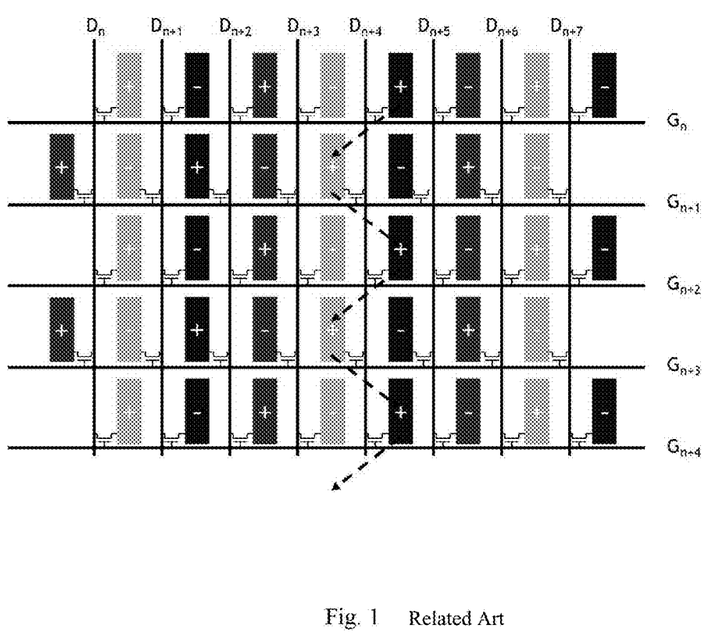
FIG. 1 is a schematic drawing of an array substrate having a 1-line dot inversion mode.

FIG. 1 is a schematic drawing of an array substrate having a 1-line dot inversion mode. As shown in FIG. 1, a voltage applied to the pixel units has a polarity inversion in the line direction and column direction using one pixel unit as a period. As far as 1-line dot inversion is concerned, in a picture mode of a 1-line dot flickering mode, all the bright pictures have a positive polarity, which results in that the liquid crystal capacitor cannot have high frequency polarity switching in either the vertical direction or the horizontal direction, thus causing serious picture flickering. 2-line dot inversion can solve the problem of picture flickering appeared in the picture mode of the 1-line dot flickering mode.

Figure 2:
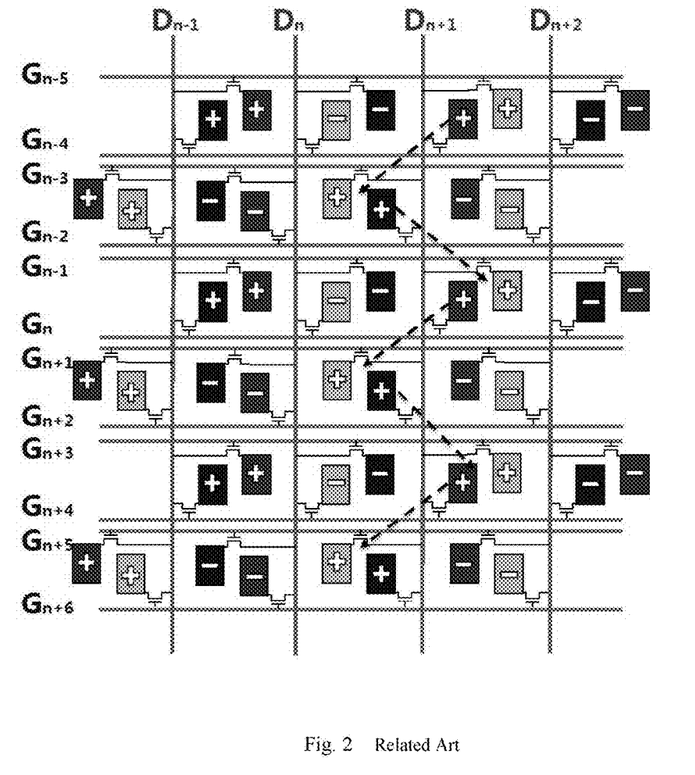
FIG. 2 is a schematic drawing of an array substrate with a dual gate line structure and having a 1-line dot inversion mode.

FIG. 2 is a schematic drawing of an array substrate with a dual gate line structure and having a 1-line dot inversion mode. A so-called "dual gate line" structure refers to that each row of pixels use two gate lines to control gates of thin film transistors corresponding to said pixels, wherein one gate line controls pixels of odd columns, while the other gate line controls pixels of even columns. As for an array substrate that has a "dual gate line" structure and is controlled by the 1-line dot inversion mode, the polarities of pixels at the two sides of each of the data lines in the same row are arranged in a positive and negative alternating pattern, so due to the influence from data line delay, pixels at the two sides of each of the data lines in the same row will have different charging effects, thus affecting the image display quality.

Figure 3:
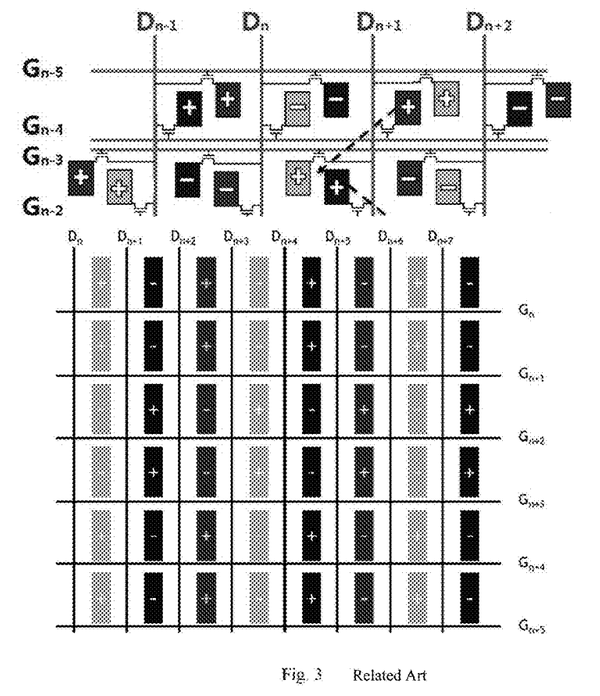
FIG. 3 is a schematic drawing of an array substrate having a 2-line dot inversion mode.

FIG. 3 is a schematic drawing of an array substrate having a 2-line dot inversion mode. As shown in FIG. 3, a voltage applied to the pixel units has a polarity inversion in the line direction using one pixel unit as a period and in the column direction using two pixel units as a period. However, when applying the 2-line dot inversion to the array substrate shown in FIG. 1, the power consumption will increase.

Figure 4:
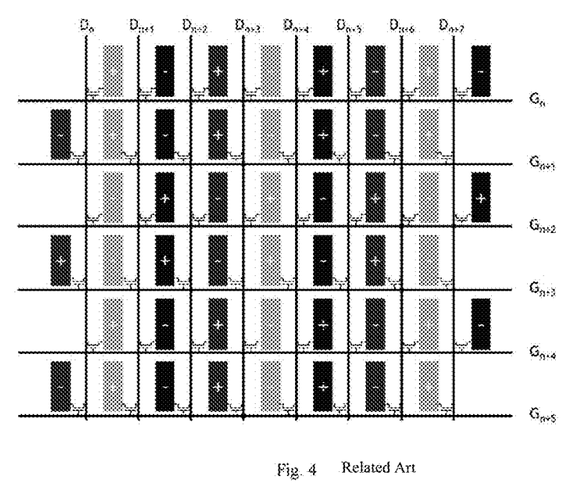
FIG. 4 is a schematic drawing showing the application of the 2-line dot inversion mode to the array substrate as shown in FIG. 1.

FIG. 4 is a schematic drawing showing the application of the 2-line dot inversion mode to the array substrate as shown in FIG. 1. As shown in FIG. 4, pixel units connected to the same data line include pixel units of a positive polarity and pixel units of a negative polarity, so it is necessary to invert, for many times, the polarities of output signals on the same data line within one frame, which greatly increases the power consumption.

It shall be appreciated that the 2-line dot inversion mode shown in FIG. 3 is exemplified by an array substrate with a single gate line structure. The 2-line dot inversion mode shown in FIG. 3 can also be applied to the array substrate with a dual gate line structure as shown in FIG. 2.

Figure 5:
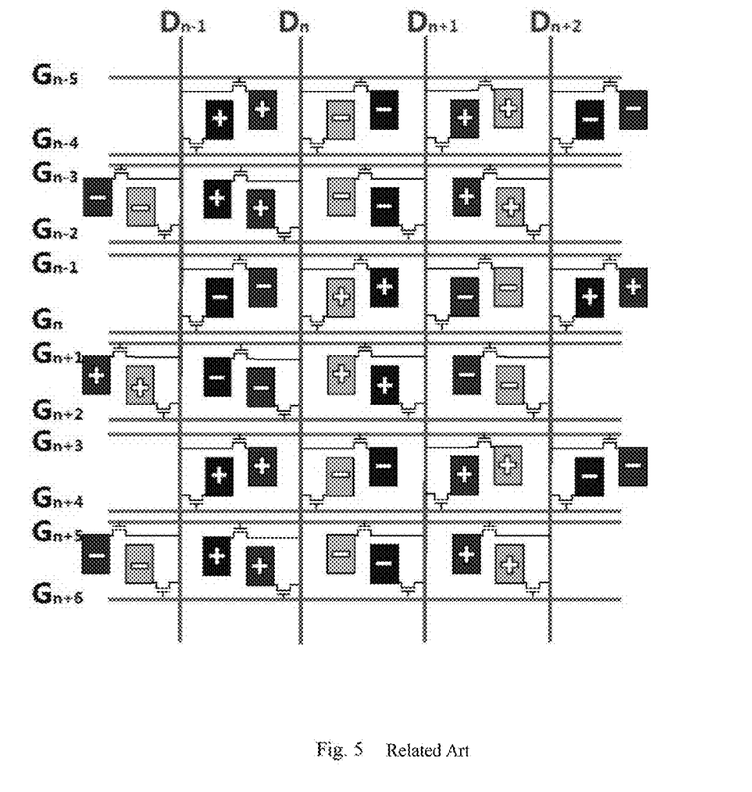
FIG. 5 is a schematic drawing showing the application of the 2-line dot inversion mode to the array substrate as shown in FIG. 2.

FIG. 5 is a schematic drawing showing the application of the 2-line dot inversion mode to the array substrate as shown in FIG. 2. Similar to the array substrate with a single gate line structure to which the 2-line dot inversion mode is applied as shown in FIG. 4, the array substrate with a dual gate line structure to which the 2-line dot inversion is applied as shown in FIG. 5 also requires to invert, for many times, the polarities of output signals on the same data line within one frame, which greatly increases the power consumption.

Figure 6:
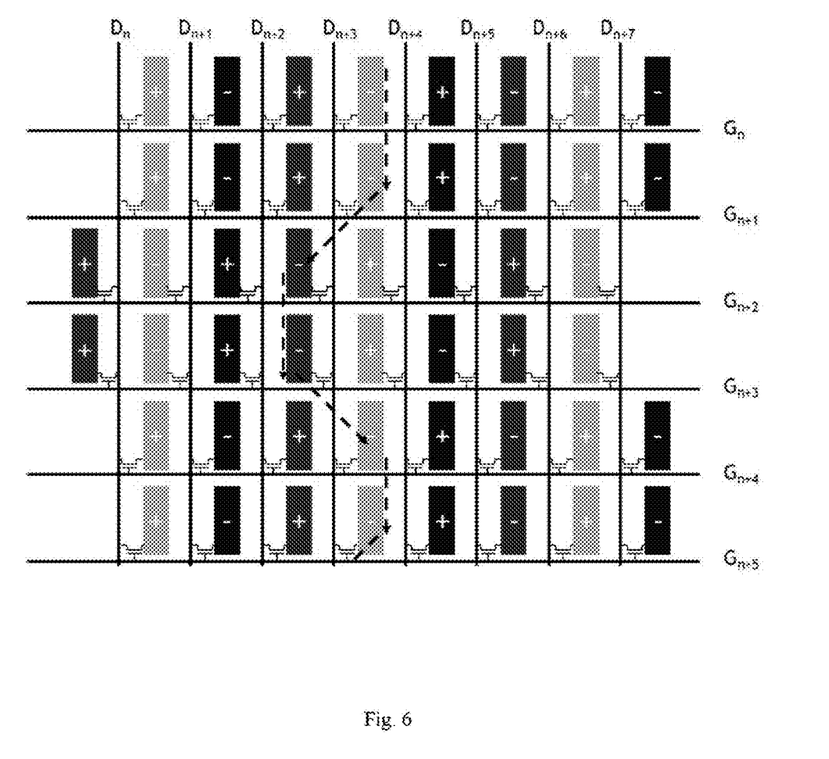
FIG. 6 is a schematic drawing of an array substrate according to one embodiment of the present application.

FIG. 6 is a schematic drawing of an array substrate according to an embodiment of the present application.

Referring to FIG. 6, an array substrate according to an embodiment of the present application comprises a plurality of gate lines Gn-Gn+5 extending in a first direction (e.g. a row direction), a plurality of data lines Dn-Dn+7 in a second direction (e.g. column direction) crossing the first direction, and a plurality of pixel units arranged into an array along the first and second directions.

Referring to FIG. 6, each data line is arranged between two columns of pixel units extending in the second direction and adjacent to each other in the first direction, and is connected to pixel units at one side of said data line or to pixel units at the other side of said data line. For example, a data line Dn+3 is arranged between two columns of pixel units extending in the column direction and adjacent to each other in the row direction, and the data line Dn+3 is connected to pixel units to its left or right.

Referring to FIG. 6, each of the plurality of data lines switches the direction of connection from one side to the other in an alternating manner with each two adjacent rows of pixel units, and the plurality of data lines have the same connection direction in each row of pixel units. For example, as indicated by the dashed lines in FIG. 6, the data line Dn+3 is connected to pixel units to its right in rows corresponding to gate lines Gn and Gn+1, and is connected to pixel units to its left in rows corresponding to gate lines Gn+2 and Gn+3, and is connected again to pixel units to its right in rows corresponding to gate lines Gn+4 and Gn+5. Data lines Dn-Dn+7 have the same direction of connection in the same row of pixel units (e.g. rows of pixel units corresponding to gate lines Gn-Gn+5 respectively).

As shown in FIG. 6, each pixel unit can include a pixel electrode and a thin film transistor. The pixel electrode is connected to a drain of the thin film transistor, the gate lines Gn-Gn+5 are connected to corresponding rows of pixel units through gates of the thin film transistors, and the data lines Dn-Dn+7 are connected to corresponding pixel units through sources of the thin film transistors.

Although FIG. 6 shows that each gate line corresponds to a row of pixel units extending in a first direction (e.g. row direction), the present application is not limited to this.

Figure 7:
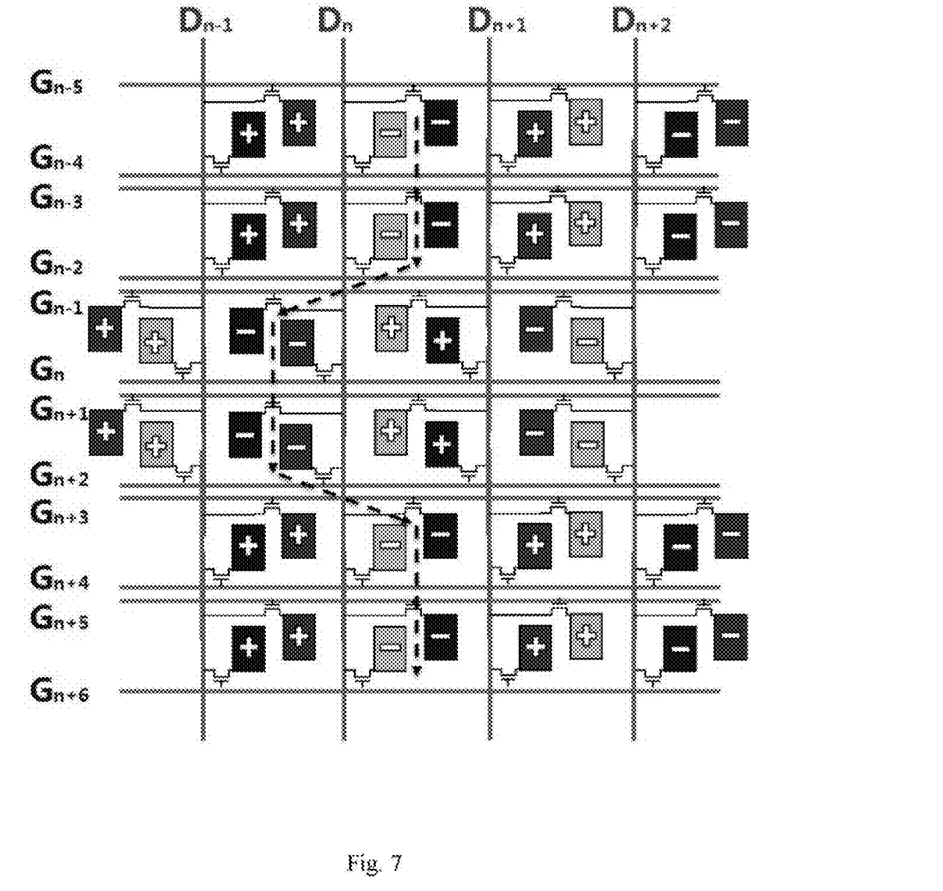
FIG. 7 is a schematic drawing of an array substrate according to another embodiment of the present application.

FIG. 7 is a schematic drawing of an array substrate according to another embodiment of the present application. FIG. 7 shows an array substrate with a "dual gate line" structure. Thus in the array substrate shown in FIG. 7, each pixel unit includes two adjacent pixels in the same row.

As shown in FIG. 7, every two gate lines correspond to a row of pixel units extending in the first direction (e.g. row direction), and are respectively arranged at two sides of said row of pixel units in the second direction (e.g. column direction).

As described above, as for an array substrate that has a "dual gate line" structure and is controlled by the 1-line dot inversion mode, the polarities of pixels at the two sides of each of the data lines in the same row are arranged in a positive and negative alternating pattern, so due to the influence from data line delay, pixels at the two sides of each of the data lines in the same row will have different charging effects, thus affecting the image display quality. The 2-line dot inversion mode can effectively alleviate this phenomenon. Therefore, the array substrate having 2-line dot inversion mode according to the present application is particularly advantageous to the array substrate with a "dual gate line" structure.

As shown in FIG. 7, each pixel unit includes a first pixel electrode and a second pixel electrode (corresponding to two pixels), as well as a first thin film transistor and a second thin film transistor corresponding to the first pixel electrode and the second pixel electrode, respectively, and the first pixel electrode and the second pixel electrode are respectively connected to respective drains of the first thin film transistor and the second thin film transistor.

Two gate lines corresponding to one row of pixel units are respectively connected to respective gates of the first thin film transistor and the second thin film transistor in said row of pixel units. For example, gate lines Gn−1 and Gn corresponding to the third row of pixel units as shown in FIG. 7 are respectively connected to respective gates of the first thin film transistors and the second thin film transistors in said row of pixel units.

Data lines are connected to the corresponding pixel units through respective sources of the first thin film transistor and the second thin film transistor. For example, as shown by the dashed lines in FIG. 7, data line Dn is connected, through respective sources of the first thin film transistors and the second thin film transistors, towards the right side to the first row of pixel units which are corresponding to gate lines Gn−5 and Gn−4 and to the second row of pixel units which are corresponding to gate lines Gn−3 and Gn−2, and is connected towards the left side to the third row of pixel units which are corresponding to gate lines Gn−1 and Gn and to the fourth row of pixel units which are corresponding to gate lines Gn+1 and Gn+2, and is again connected towards the right side to the fifth row of pixel units which are corresponding to gate lines Gn+3 and Gn+4 and to the sixth row of pixel units which are corresponding to gate lines Gn+5 and Gn+6.

As shown in FIG. 7, one of two gate lines corresponding to a row of pixel units is connected to a gate of each of the thin film transistors in said row of pixel units, while the other one of the two gate lines corresponding to the row of pixel units is connected to a gate of each of the second thin film transistors in said row of pixel units. For example, the gate line Gn−1 corresponding to the third row of pixel units as shown in FIG. 7 is connected to a gate of the first thin film transistor of each of the pixel units in said row, while the gate line Gn corresponding to the third row of pixel units as shown in FIG. 7 is connected to a gate of the second thin film transistor of each of the pixel units in said row.

According to an embodiment of the present application, a method for driving the array substrate according to the present application is provided.

As shown in FIGS. 4 and 5, when applying the 2-line dot inversion to the array substrate of the prior art as shown in FIGS. 1 and 2, pixel units connected to the same data line include pixel units of a positive polarity and pixel units of a negative polarity, so it is necessary to invert, for many times, the polarities of output signals on the same data line within one frame, which greatly increases the power consumption.

In contrast, when applying the 2-line dot inversion to the array substrate of the present application, the pixel units connected to the same data line have the same polarity, as shown in FIGS. 6 and 7. Thus when driving the array substrate according to the present application, the polarities of output signals on each data line remain unchanged within one frame, and the polarities of output signals on two data lines adjacent in the first direction (e.g. row direction) are opposite. For example, as shown in FIG. 6, in the $N^{th}$ frame, the polarity of the output signal on data line Dn is positive and remains unchanged, and the polarity of the output signal on data line Dn+1 is negative and remains unchanged, and so on, until the polarity of the output signal on data line Dn+6 is positive and remains unchanged, and the polarity of the output signal on data line Dn+7 is negative and remains unchanged. In addition, in the $(N+1)^{th}$ frame (not shown in the figure), polarities of output signals on the data lines are inverted. The polarity of the output signal on data line Dn is negative and remains unchanged, the polarity of the output signal on data line Dn+1 is positive and remains unchanged, and so on, until the polarity of the output signal on data line Dn+6 is negative and remains unchanged, and the polarity of the output signal on data line Dn+7 is positive and remains unchanged.

According to the driving method of the present application, output signals on the same data line have the same polarity within one frame, and the polarities of the output signals on the data lines are only inverted once between frames, thereby greatly reducing power consumption.

Although the embodiments of FIGS. 6 and 7 only show an array substrate having pixel units of 6 rows×8 columns as well as the corresponding data lines and gate lines, the present application is not limited to this. The array substrate according to the present application may include more rows and/or columns of pixel units and the corresponding data lines and gate lines.

Although the structure, method and system have been described with reference to exemplary embodiments, those skilled in the art shall easily understand that many modifications to the disclosed embodiments are feasible, and thus any variation shall be considered as falling within the spirit and scope of the device, method and system disclosed herein. Therefore, those ordinarily skilled in the art may make many modifications without departing from the spirit and scope of the claims.

The invention claimed is:

1. An array substrate, comprising a plurality of gate lines extending in a first direction, a plurality of data lines extending in a second direction crossing the first direction, and a plurality of pixel units arranged as an array along the first direction and the second direction, wherein,
   each of the plurality of data lines is arranged between two columns of the pixel units, the two columns of the pixel units extending in the second direction and being adjacent to each other in the first direction, and each of the plurality of data lines is connected to immediately adjacent pixel units; and
   each of the plurality of data lines switches a connection direction from one side to the other in an alternating manner with each two adjacent rows of pixel units, and the plurality of data lines have the same connection direction in each row of pixel units,
   wherein each pixel unit includes a first pixel electrode and a second pixel electrode, as well as a first thin film transistor and a second thin film transistor corresponding to the first pixel electrode and the second pixel electrode, respectively, the first pixel electrode and the second pixel electrode being respectively connected to respective drains of the first thin film transistor and the second thin film transistor,
   two gate lines corresponding to one row of pixel units are respectively connected to respective gates of the first thin film transistor and the second thin film transistor in said row of pixel units, connection relationship between gate lines and the first and the second thin film transistors being changed once every two rows of pixel units,
   the data lines are connected to the corresponding pixel units through respective sources of the first thin film transistor and the second thin film transistor.

2. The array substrate according to claim 1, wherein each of the plurality of gate lines corresponds to a row of pixel units extending in the first direction.

3. The array substrate according to claim 2, wherein each pixel unit includes a pixel electrode and a thin film transistor, the pixel electrode being connected to a drain of the thin film transistor, one of the plurality of gate lines being connected to the pixel unit through a gate of the thin film transistor, and one of the plurality of data lines being connected to the corresponding pixel unit through a source of the thin film transistor.

4. The array substrate according to claim 1, wherein every two gate lines correspond to a row of pixel units extending in the first direction, and are respectively arranged at two sides of said row of pixel units in the second direction.

5. The array substrate according to claim 1, wherein the first pixel electrode and the second pixel electrode are arranged in the pixel units along the first direction.

6. The array substrate according to claim 1, wherein one of the two gate lines corresponding to a row of pixel units is connected to a gate of each of the first thin film transistors in said row of pixel units, while the other one of the two gate lines corresponding to the row of pixel units is connected to a gate of each of the second thin film transistors in said row of pixel units.

7. The array substrate according to claim 1, wherein the polarities of output signals on each data line remain unchanged within one frame, and the polarities of output signals on two data lines adjacent in the first direction are opposite.

8. The array substrate according to claim 7, wherein the polarities of output signals on each data line are inverted once between two adjacent frames.

9. A display device, which comprises the array substrate according to claim 1.

10. The display device according to claim 9, wherein each of the plurality of gate lines corresponds to a row of pixel units extending in the first direction.

11. The display device according to claim 10, wherein each pixel unit includes a pixel electrode and a thin film transistor, the pixel electrode being connected to a drain of the thin film transistor, one of the plurality of gate lines being connected to the pixel unit through a gate of the thin film transistor, and one of the plurality of data lines being connected to the corresponding pixel unit through a source of the thin film transistor.

12. The display device according to claim 9, wherein every two gate lines correspond to a row of pixel units extending in the first direction, and are respectively arranged at two sides of said row of pixel units in the second direction.

13. The display device according to claim 9, wherein the first pixel electrode and the second pixel electrode are arranged in the pixel units along the first direction.

14. The display device according to claim 9, wherein one of the two gate lines corresponding to a row of pixel units is connected to a gate of each of the first thin film transistors in said row of pixel units, while the other one of the two gate lines corresponding to the row of pixel units is connected to a gate of each of the second thin film transistors in said row of pixel units.

15. The display device according to claim 9, wherein the polarities of output signals on each data line remain unchanged within one frame, and the polarities of output signals on two data lines adjacent in the first direction are opposite.

16. The display device according to claim 15, wherein the polarities of output signals on each data line are inverted once between two adjacent frames.

17. A method of driving the array substrate, the array substrate comprising a plurality of gate lines extending in a first direction, a plurality of data lines extending in a second direction crossing the first direction, and a plurality of pixel units arranged as an array along the first direction and the second direction, wherein each of the plurality of data lines is arranged between two columns of the pixel units, the two columns of the pixel units extending in the second direction and being adjacent to each other in the first direction, and each of the plurality of data lines is connected to immediately adjacent pixel units; and wherein each of the plurality of data lines switches a connection direction from one side to the other in an alternating manner with each two adjacent rows of pixel units, and the plurality of data lines have the same connection direction in each row of pixel units, the method comprising: keeping the polarities of output signals on each data line unchanged within one frame, and making the polarities of output signals on two data lines adjacent in the first direction to be opposite, so that a voltage applied to the pixel units has a polarity inversion in the first direction using one pixel unit as a period and in the second direction using two pixel units as a period, wherein each pixel unit includes a first pixel electrode and a second pixel electrode, as well as a first thin film transistor and a second thin film transistor corresponding to the first pixel electrode and the second pixel electrode, respectively, the first pixel electrode and the second pixel electrode being respectively connected to respective drains of the first thin film transistor and the second thin film transistor, two gate lines corresponding to one row of pixel units are respectively connected to respective gates of the first thin film transistor and the second thin film transistor in said row of pixel units, connection relationship between gate lines and the first and the second thin film transistors being changed once every two rows of pixel units, the data lines are connected to the corresponding pixel units through respective sources of the first thin film transistor and the second thin film transistor.

18. The method according to claim 17, wherein the polarities of output signals on each data line are inverted once between two adjacent frames.

* * * * *